US007167108B2

(12) United States Patent
Chu et al.

(10) Patent No.: US 7,167,108 B2

(45) Date of Patent: Jan. 23, 2007

(54) METHOD AND APPARATUS FOR SELECTING PARTICULAR DECODER BASED ON BITSTREAM FORMAT DETECTION

(75) Inventors: Shiqiang Chu, Knoxville, TN (US); Richard Chi-Te Shen, Leonia, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/536,648

(22) PCT Filed: Nov. 26, 2003

(86) PCT No.: PCT/IB03/05441

§ 371 (c)(1), (2), (4) Date: May 27, 2005

(87) PCT Pub. No.: WO2004/051982

PCT Pub. Date: Jun. 17, 2004

(65) Prior Publication Data

US 2006/0114136 A1 Jun. 1, 2006

Related U.S. Application Data

(60) Provisional application No. 60/430,930, filed on Dec. 4, 2002.

(51) Int. Cl.
*H03M 7/34* (2006.01)

(52) U.S. Cl. .......... 341/51

(58) Field of Classification Search .......... 341/50, 341/51, 106, 55; 704/500, 201; 369/47.15–19
See application file for complete search history.

(56) References Cited

U.S. PATENT DOCUMENTS

| | | | | |
|---|---|---|---|---|
| 6,324,515 | B1 * | 11/2001 | Rabipour et al. | 704/500 |
| 6,330,666 | B1 | 12/2001 | Wise et al. | |
| 6,977,877 | B1 * | 12/2005 | Mori | 369/47.24 |
| 2001/0024568 | A1 | 9/2001 | Mori | |

* cited by examiner

*Primary Examiner*—Brian Young

(57) ABSTRACT

The present invention provides an apparatus and method for switching between particular decoders within a plurality of decoders, each decoder adapted to decode bit streams having a unique format. The apparatus comprises format detectors which output format indicators based on information from the bit stream. Logic responsive to the format detector output may determine a particular decoder among the plurality of decoders. The particular decoder determined by the logic decodes the formatted bit stream. At least one switch, responsive to the determination of the logic, connects the formatted bit stream to the particular decoder. The format detectors detect at least one of the frame information, or start code, the packet header information, and the code word values in a portion of a coded content of the bit stream, wherein the code word values, derivatives thereof, or a pattern of code word values, are unique to the bit stream format.

36 Claims, 6 Drawing Sheets

METHOD AND APPARATUS FOR SELECTING PARTICULAR DECODER BASED ON BITSTREAM FORMAT DETECTION

CROSS REFERENCE TO RELATED CASES

This application is a 371 of PCT/IB03/05441 filed Nov. 26, 2003 which claims benefit of 60/430,930 filed Dec. 4, 2002.

This invention relates generally to devices for decoding audio and/or video bit streams of varying format without producing presentation artifacts. This invention relates more particularly to detecting format changes quickly enough to switch decoders before a presentation artifact can be generated Digital audio and visual data are sent in bit streams over communication lines, including the internet, in a variety of data compression formats (hereinafter "format"). Each unique format may require a correspondingly unique decoder to convert the bit stream content information into its presentation form: audio or video. Examples of such formats are four MPEG formats ISO/IEC 13818-3, ISO/IEC 11172-3, ISO/IEC 13818-7 and ISO/IEC 14496-3 and the AC-3 format. Stream identifications (IDs) are provided in the formatted data stream which were originally intended to identify the format type. As the standards have evolved, stream IDs have become unreliable because they do not uniquely identify the format of the formatted bit stream. For example, stream ID 0×C0 is used for all four of the MPEG formats while two of them, ISO/IEC 13818-7 and ISO/IEC 11172-3 require different decoders. Both video and audio data is conventionally arranged in frames. An approach to format detection has been to use independent a priori information about the bit stream as a format guide. The information must be parsed to be used. At modern data rates, such slow methods leave gaps, or presentation artifacts, in the presentation of the data. Even with the best tools available, the exact point at which the format change actually takes place cannot be reliably and precisely indicated. Thus, current methods of parsing a priori independent information to switch content decoders usually still produces annoying presentation artifacts.

Thus an apparatus and a method is needed to select content decoders fast enough to avoid the creation of presentation artifacts.

The present invention provides an apparatus for switching between a plurality of bit stream decoders, each decoder adapted to decode bit streams having a unique format. The apparatus comprises one or more format detectors which gather information only from the bit stream. The format detector output feeds logic, which is responsive to the detector output to determine a particular appropriate decoder among the plurality of decoders. The particular decoder determined by the logic may be responsive to the formatted bit stream to decode the formatted bit stream. At least one switch, responsive to the determination of the logic, connects the formatted bit stream to the input of the particular decoder. The format detectors detect at least one of the frame information, the packet header information, and the code word values in a portion of a coded content of the bit stream, wherein the code word values, derivatives thereof, or a pattern of code word values, are unique to the bit stream format Methods are disclosed for detecting formats for switching between decoders for formatted bit streams. The methods may employ a plurality of format detectors arranged in sequence, parallel, or a hybrid arrangement In sequenced format detectors, the later stages may only be used when a previous stage returns an ambiguous result. The methods comprise detecting the bit stream format only from the bit stream. The method further comprises determining the correct decoder for decoding the detected bit stream format and switching the formatted bit steam to the correct decoder.

The present invention has the advantage of being faster than table-parsing and other a priori methods. Only a small amount of data need be processed to determine format and select the correct decoder.

The present invention has the advantage of being adaptable, even as standards proliferate and confusion among the various standards increases, because any truly unique, new standard must be detectable by at least one of the methods provided.

The foregoing and other features and advantages of the seamless agile decoder will be apparent from the following more particular description of specific embodiments of the seamless agile decoder, as illustrated in the accompanying drawings, wherein.

Figure 1:
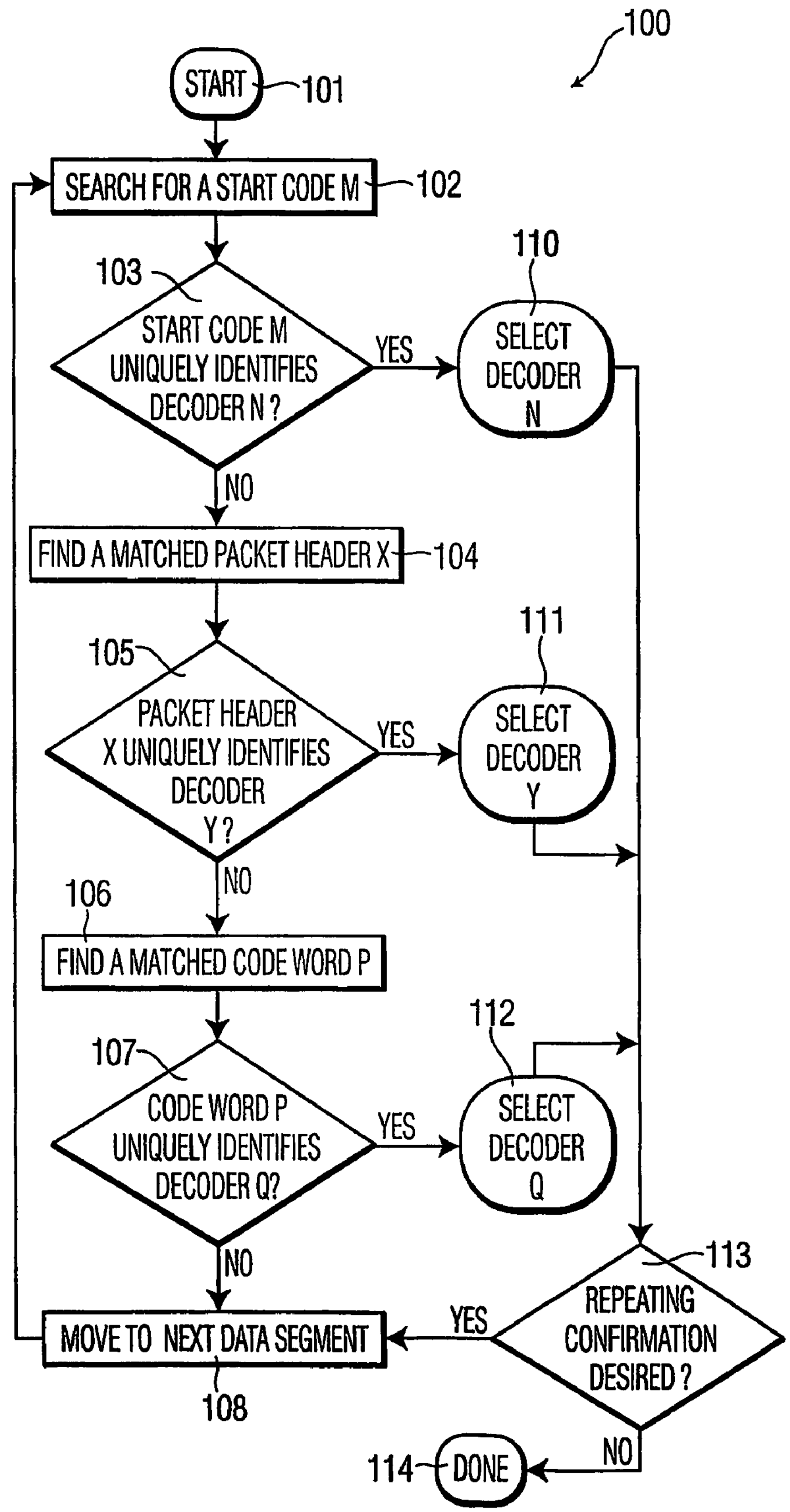
FIG. 1 depicts a flow chart of the steps of an exemplary embodiment of the method of the present invention.

Referring now to the figures, FIG. 1 depicts an exemplary method 100 of detecting the format of a bit stream. At the start 100, a data segment from the formatted data stream may be read for analysis. The data segment will conventionally contain frame synchronization and frame structure information, such as a potentially unique start code, a packet header, and content which includes potentially unique code words. The first step 102 searches the data segment for a particular start code M, which reflects frame synchronization and frame structure information, also called "frame information." The start code indicates the starting point of a frame and may be read directly. Some formats use unique start codes. Upon obtaining the particular start code M, step 103 determines if the start code M uniquely indicates a particular decoder N to be used for the detected data stream. In some embodiments, other frame information may be used. For example, the frame size, which is the number of bits between start codes, may be unique to some formats. A start code is an example of a format indicator. A format indicator is a feature that may be read from the bit stream and from which information about the format of the bit stream may be gathered. "Start code" is used herein to represent format indicators based on frame information. The relationship between formats and decoders is not strictly one-to-one. Decoder N may represent a particular one of a plurality of decoders, which may be selected based upon a particular one start code of a plurality of possible start codes. Start code M represents a particular one of all the possible start codes. The set of the plurality of decoders that may be decoder N may partially overlap the sets of decoders that may be decoder Y and decoder Q. That is, an individual decoder may be selected on the basis of a start code, a packet header, or a code word detection at different times for slightly different formats which may use the same decoder.

The determination may be made, for example, by looking up the start code in a start code table contained in or available to the logic 360 (FIG. 3) implementing the decision. For example, start code M may be associated with decoder N in the start code table, so performing a lookup in the table may return a decoder N determination. For a counter-example, if the start code M has no decoder associated with it in the start code table, the lookup operation will not return a decoder determination. The table lookup does not require parsing of the table. For example, the table may be a hash table. If start code M is uniquely associated with decoder N, then the appropriate decoder N has been determined and may be selected in step 110. When the decoder N is selected, it begins decoding the formatted bit stream. If start code M does not uniquely identify a decoder N, then an ambiguity exists: which decoder to use is unknown.

In step 104, the ambiguity is avoided by using a second approach to uniquely detecting the format the packet header X may be read and compared to entries in a packet header table. The packet header X may uniquely determine a decoder Y to be used, as indicated by finding decoder Y associated with packet header X in a table lookup. If a decoder Y is uniquely determined, then decoder Y may be selected in step 111. If a decoder Y is not uniquely determined, then an ambiguity still exists.

In step 106, the ambiguity is again avoided by using a third approach to uniquely detecting the format: code word P may be read and compared in step 107 to entries in a table to determine if decoder Q is uniquely determined. If code word P does not uniquely identify a particular decoder Q, then the ambiguity remains unresolved. In that case, step 108 reads the next data segment and the process begins again at 101. If code word P does uniquely determine a decoder Q, then decoder Q is selected in step 112. In an alternate embodiment, step 107 may be modified to find a plurality of code words in the data segment, and to match a pattern of such code words to a table entry to uniquely determine a decoder.

Code words may be obtained in different ways. Different code books are used for different coding standards which, in turn, require different decoders. Code books contain the code words used for encoding the data in the contents portion of the data packet. Some codes contain code words unique to their corresponding formats. For example, a Huffman audio coding standard may contain a unique code word. A unique code word determines the format, or coding, and, therefore, the appropriate decoder. In some cases, a unique signature can be derived from a code that does not have unique code words. For example, a Huffman code without unique code words may be decoded to extract the actual audio sample value and that value can be applied to a reconstruction equation unique to each format. If the value is improper for a particular format, it will cause an overflow result from the reconstruction equation. The reconstruction equations for all formats may be tested to find the one that does not overflow. That reconstruction equation determines the format, and therefore, the correct decoder to be used. The most likely formats are tested first. Code word derivatives such as the actual audio sample value are also referred to herein as "code word values." Video coding uses a variety of coding methods, including sub-band coding, motion-compensation coding, and vector quantization. Each method has a separate code book and may have unique code words. Derivation methods may be devised for each coding method by an approach similar to that discussed above. Patterns of code words may also be unique. For example, several codes may have code words A and B, but only one may have A, B, and C, where C is not independently unique. Deriving code words may be a slow process in some instances, so it is usually the last choice among the detection methods presented.

After any decoder selection 111–112, step 113 decides if repeating confirmation is desired. If so, the next data segment is read in step 108, and the process restarts at step 102. If not the process halts 114 until an external trigger initiates process 100 again at step 101. In some embodiments, periodic format determination 100 may be desired. In other embodiments, continuous format determination may be desirable. For example, if someone attempted to protect data by including frequent format changes, continuous format detection would be needed. In such embodiments, step 113 repeats the format detection at a predetermined interval, which may be every data segment The order in which format detectors are called begins with the fastest (the start code detector 102–103) and ends with the slowest (code word detector 106–107). Other orderings are contemplated, for example, for embodiments normally detecting data streams that are known to have no unique start codes. Also, other criteria for ordering the steps may be used, such as putting the format detector with the highest probability of determining a unique decoder first, and the format detector with the lowest probability of unique determination last.

The process 100, like the processes described below, may be implemented in hardware, software, firmware, or hybrids thereof. Because adaptability to presently undefined future formats is important, a software implementation may be preferred for some applications. For other applications, hardware embodiments may be preferred for their speed. Embodiment 100 may be the fastest exemplary embodiment depicted. The other embodiments may be attractive for particular applications. For example, in a real-time computer application wherein the accuracy of the determination is critical, the embodiment depicted in FIG. 2 may be useful.

Figure 2:
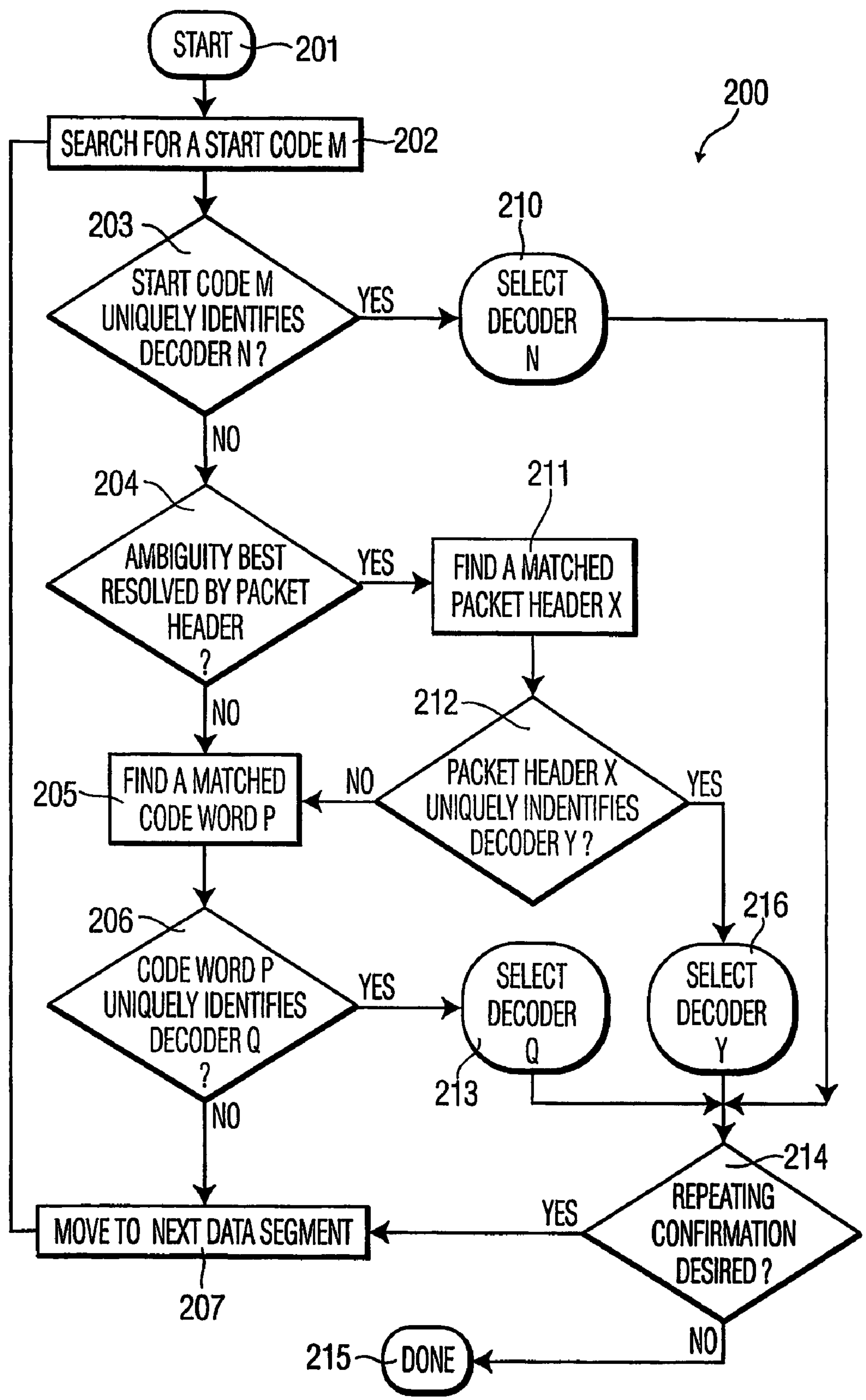
FIG. 2 depicts a flow chart of the steps of a second exemplary embodiment of the method of the present invention.

FIG. 2 shows an exemplary alternate embodiment 200 of a seamless agile decoder process. The process starts at step 201 by reading a data segment. In step 202, the data segment may be searched for a start code M. If the start code M uniquely determines a decoder N, then decoder N is selected in step 210. If the start code M does not uniquely determine a decoder N, then the next detector may be selected by step 204, based on the particular ambiguity found. For example, the start code M may narrow the choice to three decoders. For choosing between those three possibilities, one of the remaining detectors may be better than the other. Upon limiting the choices, step 203 may pass step 204 an ambiguity descriptor, which may be as simple as a list of the remaining possibilities. In an embodiment, the ambiguity descriptor may be a binary number, wherein each digit represents a decoder, and each digit may be zero if the corresponding decoder has been eliminated in step 203, and may be a one if the corresponding decoder is a possibility. If step 203 cannot limit the choices, a default descriptor can be sent to step 204. Thus, the binary number zero may be a default descriptor, in which case the process 200 would proceed as if it were embodiment 100.

Step 204, the resolution logic, decides which step may be next based upon the ambiguity descriptor. If the ambiguity can best (quickest or most reliably) be resolved by the packet header detector 211–212, the packet header may be detected. The particular packet header X to be searched for may be found by a table lookup based upon the ambiguity descriptor in step 211, wherein the packet header X which will resolve the ambiguity is associated in the table with the ambiguity descriptor. If the packet header X uniquely identifies the decoder Y in step 211, given the start code detector results, decoder Y is selected in step 216. If the packet header X does not uniquely identity the decoder Y, the process proceeds to step 205. In an alternate embodiment, step 212 may modify the ambiguity descriptor before passing it to step 205. If the start code ambiguity can best (quickest, most reliably, most probably, etc., as appropriate for the particular application) be resolved by the code word detector 205–206, the process proceeds from step 204 directly to step 205.

Step 205 searches for code words from the content of the data segment, based on the ambiguity descriptor passed from step 204 or step 212. If a code word P uniquely identifies the decoder Q in step 206, given the ambiguity descriptor, decoder Q is selected in step 213. If the code word P does not uniquely identify the decoder Q, then the process acquires the next data segment in step 207. Note that, if step 205 follows step 204, the packet header detector 211–212 is never accessed. In an alternate embodiment, all detectors 202–203, 211–212, and 205–206 are accessed before step 207.

As with embodiment 100, a question of repetition is raised in step 214 after decoder selection 213, 215, or 216. If repetition is not desired, the process ends at step 215. Otherwise, step 207 acquires the next data segment and the process starts again at step 202. Those of ordinary skill in the art will appreciate that the format detections 202–203, 211–212, and 205–206 may be interchangeable as to order. Such variations of embodiment 200 are contemplated in the present invention. Likewise, those of ordinary skill in the art will appreciate that additional format detections may be added to embodiment 200.

Some alternate embodiments may be designed for systems that receive only limited subsets of all possible formats, and the order of the format detections may be adapted to those systems.

Figure 2A:
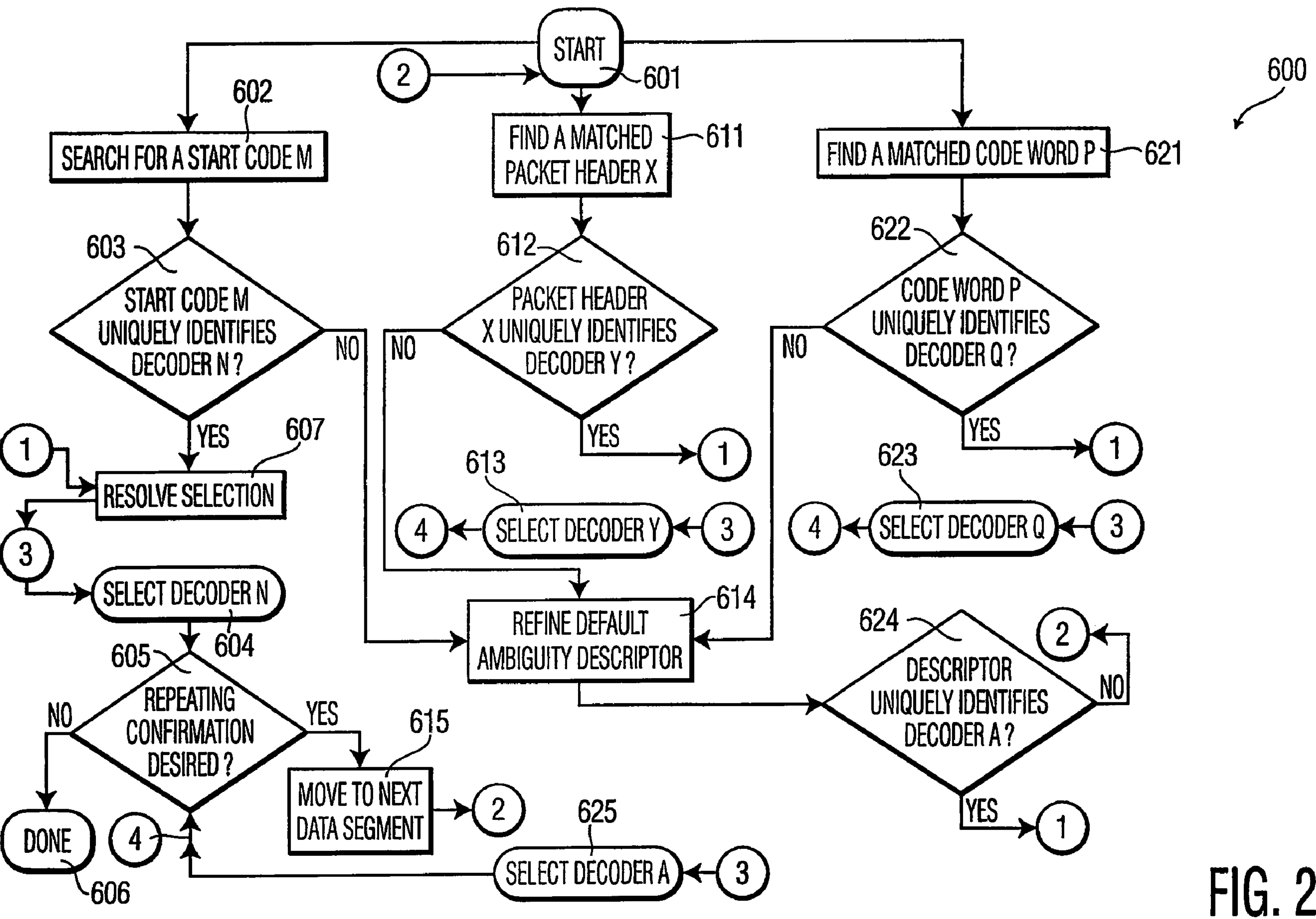
FIG. 2A depicts a flow chart of the steps of a third exemplary embodiment of the method of the present invention.

FIG. 2A depicts an exemplary embodiment 600 of a parallel method for format detection. Each of the three detection methods 602–603, 611–612, and 621–622, run concurrently. Decisions made by the parallel detection methods 602–603, 611–612, and 621–622 may be accumulated and sorted in step 607. If more than one format detection 602–603, 611–612, and 621–622 each find a unique decoder, decoder selections 604, 613, or 623 may be sorted according to a criterion, such as first-in-time criterion, in step 607. The first-in-time detection of a unique decoder results in selection 604, 613, or 623, respectively, of an appropriate decoder being selected in step 607. A first-in-time detection selection 604, 613, or 623 initiates step 605, which determines if the confirmation should be repeated. If so, step 615 acquires the next data segment, shutting off any processing by the other two detection methods. If repetition is not desired, the process 600 ends at step 606, also shutting off the other two detection methods. Either way, a first-in-time unambiguous determination controls the decoder selection. In some embodiments, the first-in-time selection algorithm in step 606 may be replaced by different selection criteria. For example, the results of all successful detections may be obtained and subjected to a probability criterion or a weighted probability criterion in step 606. In some embodiments, step 606 may be omitted, allowing a first-in-time decoder selection algorithm to control. If none of the detection methods 602–603, 611–612, or 621–622 produce an unambiguous decoder determination, additional steps 614 and 624 may be implemented. As each detection method fails, any information gathered by the attempt is used to update a default ambiguity descriptor in step 614. For example, the ambiguity descriptor may be a binary number, with each digit, or bit, corresponding to a particular decoder. The default value is zero for each bit, indicating no detector has been found. If the first detection method determines that there are three possible decoders, but cannot determine which of the three is correct, each bit in the ambiguity descriptor corresponding to a possible decoder is changed to a one. The next detection method to finish also produces an ambiguity descriptor, which is bitwise logically ANDed with the first ambiguity descriptor. Thus, those decoders that are found to be possible, or cannot be eliminated by both of the first two methods, will each have a one in the bit corresponding to the possible decoder. The information from the third method to produce results is similarly incorporated. Step 624 then asks if a unique decoder “A” has been found, i.e., is there only one bit with a value of one in the ambiguity descriptor? If so, that decoder “A” is selected in step 625. In an embodiment, step 625 may make a first-in-time decoder determination based upon the individually ambiguous outputs of the two fastest methods. Thus, even if the slowest method was destined to arrive at a unique decoder determination, the sum of the two fastest detection outputs may find it first. The advantage of embodiment 600 is that it may use all of the information gathered by the format detections. If repetition is desired, the process returns to step 601.

Figure 3:
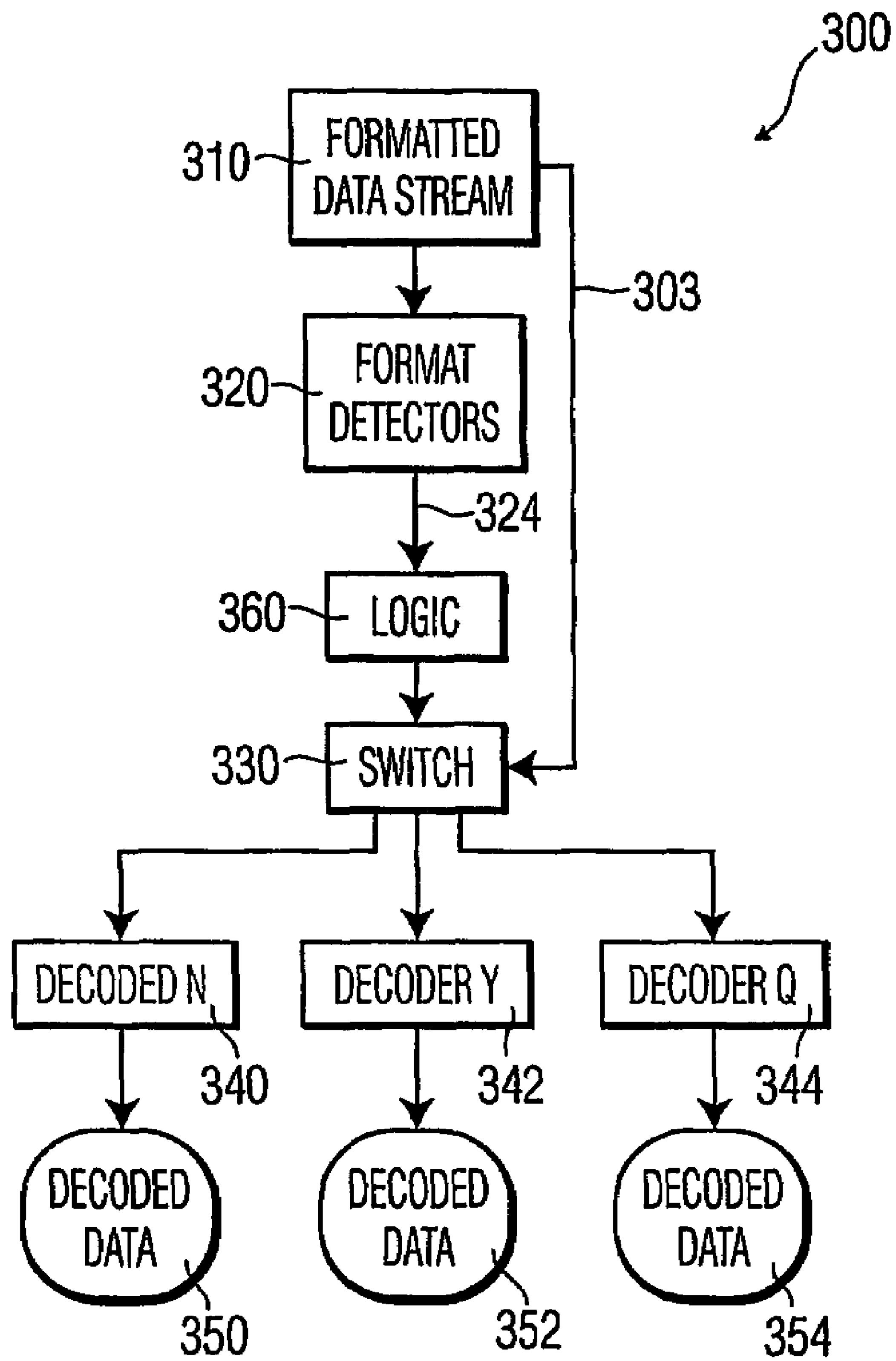
FIG. 3 depicts a block diagram of an exemplary embodiment of the apparatus of the present invention.

FIG. 3 shows a block diagram of an exemplary embodiment 300 of the seamless agile decoder apparatus. Formatted data stream 310 may be split to connect to the format detectors 320 and a switch 330. Format detectors 320 include hardware and/or software to instantiate process steps such as 102, 104, 106, 202, 211, and/or 205 or variations thereof (See FIGS. 1–2). The detected start code, packet header, or code word is sent by path 324 to the logic 360, which may uniquely determine which decoder 340, 342, 344 may is appropriate for the format detected. In some embodiments, format detectors 320 and logic 360 are integrated. Once logic 360 has determined the appropriate decoder, switch 330 directs the formatted data stream on line 303 to the selected decoder 340, 342, or 344. Line 303 may include delays or buffers to compensate for the processing time of the format detectors and logic. Decoder 340, 342, or 344, as selected, produces decoded data 350, 352, or 354, respectively. In some embodiments, the switch 330 is integral with logic 360 and format detectors 320.

Figure 4:
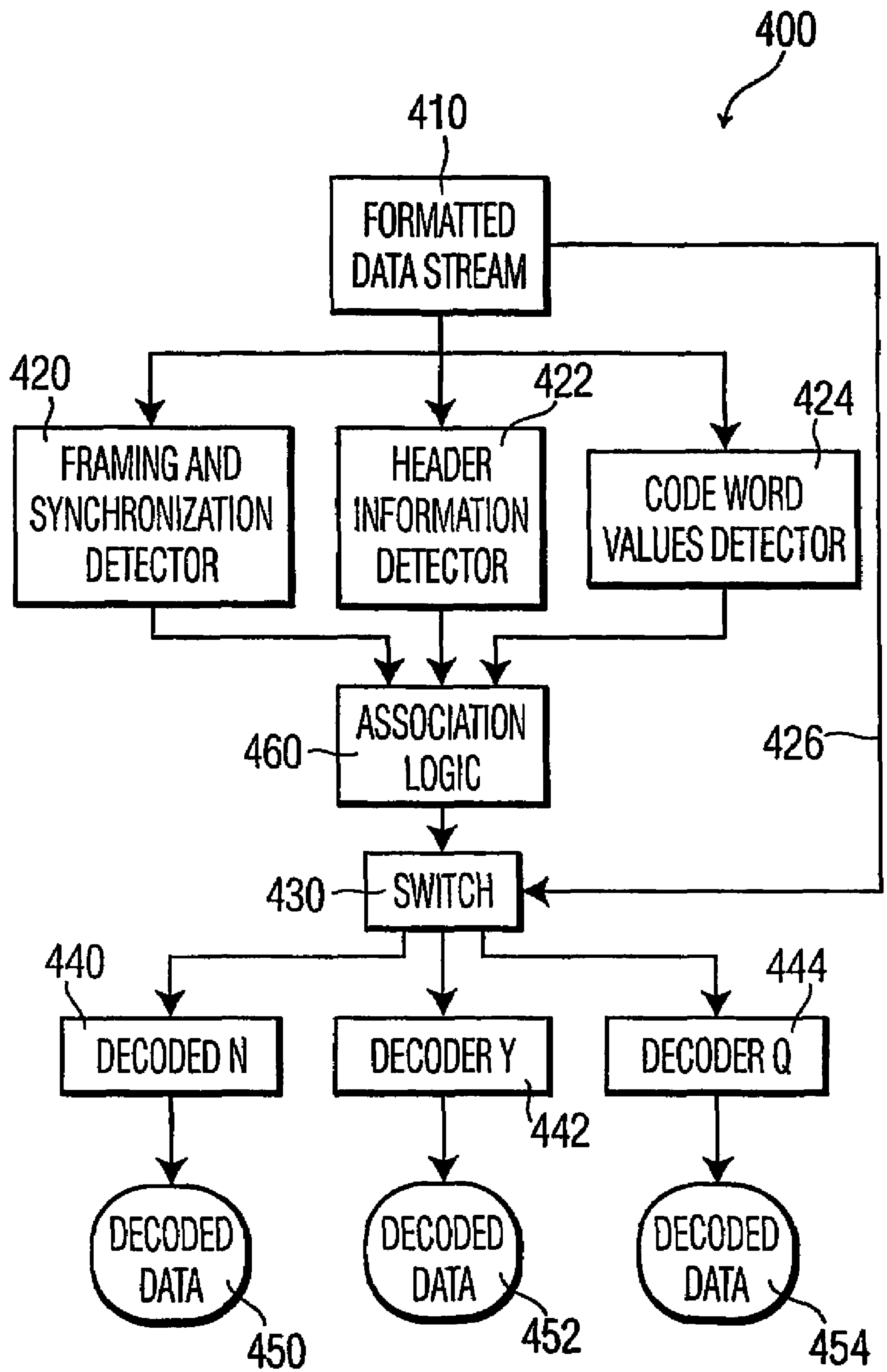
FIG. 4 depicts a block diagram of a second exemplary embodiment of the apparatus of the present invention.

FIG. 4 shows an exemplary alternate embodiment 400 of the seamless agile decoder wherein all three format detectors 420, 422, and 424 each receive copies of a data segment from formatted data stream 410. In some embodiments, the data segment will be the same data segment for all format detectors. In an alternate embodiment, the data segments may be sequential data segments, with the slowest format detector getting the first data segment and the fastest format detector getting the last in the sequence. AR detectors 420,422, and 424 may operate simultaneously.

The outputs of the format detectors 420, 422, and 424 are sent to the association logic 460. Association logic may instantiate two selection methods. The first method is to select the first-in-time unambiguous decoder determination and activate switch 430 to implement that decoder determination. The second method, used when all outputs are ambiguous, is to take the first-in time ambiguity descriptor and refine it with the subsequent ambiguity descriptors from the other format detectors to determine if a single decoder remains after all refinements. If a single decoder is indicated by the final ambiguity descriptor, that decoder is selected.

Otherwise, the next data segment is acquired and the process restarts. If the process instantiated in embodiment 400 succeeds, formatted stream data 410 is connected along line 426 to switch 430, and there through to the appropriate decoder 440, 442, or 444. Line 426 may have delays or buffers to compensate for the processing time of detectors 420, 422, and 424, and the association logic 460. In some embodiments, the format detectors, association logic, and the switch may be integral. In many embodiments, the decoders 440, 442, and 444 are also integrated with the detectors 420, 422, and 424, and the association logic 460.

Figure 5:
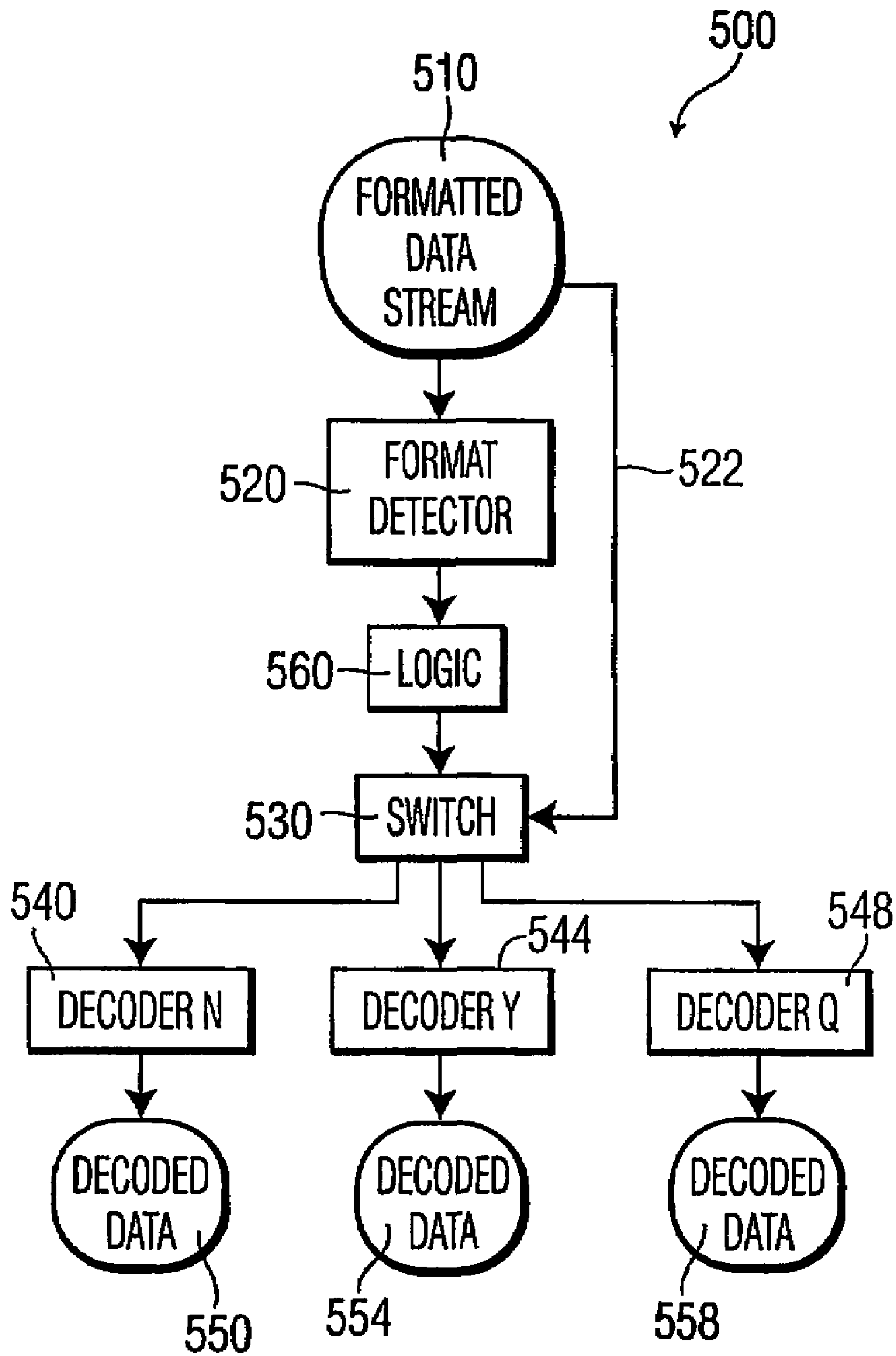
FIG. 5 depicts a block diagram of a third exemplary embodiment of the apparatus of the present invention.

FIG. 5 shows a block diagram of a particular alternate embodiment 500 having a single format detector 520. This embodiment illustrates that, even with a single format detector 520, logic 560 is still required to determine the appropriate decoder from the code word, packet header, or start code detected. Logic 560 includes lookup tables for determining a decoder 540, 544, or 548 from the detected code word, packet header, or start code. Switch 530 may be a microelectronic circuit integral to the logic 560.

As formats evolve, it is possible that a single format detector 520 will suffice. It is also contemplated that other detectible format features may be discovered, perhaps as patterns of code words, start codes, and packet headers, or that new detectible format features may be added in the future. The detection methods provided herein are extensible to new and additional detectable format features.

The foregoing description has described selected embodiments of methods and apparatuses for seamless agile decoding.

While the invention has been particularly shown and described with reference to selected embodiments thereof, it will be readily understood by one of ordinary skill in the art that, as limited only by the appended claims, various changes in form and details may be made therein without departing from the spirit and scope of the invention. For example, a seamless agile decoder may comprise a plurality of format detectors for different frame synchronization and frame structure features.

The invention claimed is:

1. An apparatus for switching between a plurality of bit stream decoders, each decoder adapted to decode a formatted bit stream having a unique format, the apparatus comprising:

at least one format detector, the format detector gathering information from the bit stream, the information being used by logic to generate an output indication of a particular decoder among the plurality of decoders; and logic, the logic being responsive to the output of the at least one format detector to determine the particular decoder, wherein the at least one format detector at least has means to detect at least one of frame synchronization information of the formatted bit stream and frame structure information of the formatted bit stream.

2. The apparatus of claim 1, further comprising at least one switch, the at least one switch responsive to the determination of the logic to connect the formatted bit stream to an input of the particular decoder.

3. The apparatus of claim 1, wherein the particular decoder comprises a decoder responsive to the formatted bit stream to decode the formatted bit stream.

4. The apparatus of claim 1, wherein the at least one format detector comprises a device configured to detect header information in the bit stream.

5. The apparatus of claim 1, wherein the at least one format detector comprises a device configured to detect at least one of code word values, derivatives of code word values, and patterns of code word values, in a portion of a coded content of the bit stream.

6. The apparatus of claim 1, wherein the at least one format detector comprises at least two of:

a format detector configured to detect frame synchronization information of the bit stream and frame structure information of the bit stream;

a format detector configured to detect header information in the bit strewn; and a format detector configured to detect at least one of a code word, a derivative of a code word, a pattern of code words, a code word value, a derivatives of a code word value, and a pattern of code word values, in a portion of a coded content of the bit steam.

7. The apparatus of claim 6, wherein the at least two format detectors operate in staged sequence.

8. The apparatus of claim 7, comprising a later-staged format detector of the at least two format detectors configured to operate only if the earlier-staged format detector of the at least two format detectors returns an ambiguous result.

9. The apparatus of claim 8, wherein the later-staged format detector comprises a format detector configured to resolve possible ambiguities in results from the earlier-staged format detector stage.

10. The apparatus of claim 9, further comprising at least three unique format detectors and resolution logic, the resolution logic responsive to particular ambiguities in the results of a first-stage format detector to select as the second-stage format detector the format detector which can best resolve the particular ambiguities.

11. The apparatus of claim 6, wherein the at least one format detector comprises a plurality of unique format detectors in parallel and wherein the logic comprises association logic, the association logic operative to receive outputs from the plurality of format detectors and to select a decoder based on at least one format detector output.

12. The apparatus of claim 11, wherein the association logic selects a decoder based on outputs from a plurality of format detectors, the outputs comprising ambiguity descriptors.

13. The apparatus of claim 1, wherein the logic uses, without table parsing, at least one lookup table, the at least one lookup table searchable by detection results to provide a decoder determination.

14. The apparatus of claim 1, wherein the logic comprises logic configured to determine a particular decoder from at least one of frame information, header information, and content code word information.

15. The apparatus of claim 14, wherein the logic comprises at least one of hardware, software, and firmware.

16. The apparatus of claim 1, wherein the format detector comprises logic responsive to an external trigger to initiate format detection.

17. The apparatus of claim 1, wherein the format detector periodically detects the bit stream format.

18. The apparatus of claim 1, wherein the format detector continuously detects the bit stream format.

19. The apparatus of claim 6, further comprising association logic, wherein the at least two format detectors operate in parallel, the association logic operative to at least one of receive a first-in-time unambiguous format detection and unambiguously determine the bit stream format from outputs of the at least two format detectors.

20. The apparatus of claim 1, wherein the at least one format detector and the logic are integrated.

21. An apparatus for switching between particular decoders in a plurality of bit stream decoders, each decoder uniquely adapted to decode a formatted bit stream having a correspondingly unique format, the apparatus comprising at least one format detector, the at least one format detector gathering bit stream information from the bit stream, the bit stream information being used to generate an output indication of a particular decoder among the plurality of decoders, wherein logic responsive to bit stream information gathered by the at least one format detector is configured to determine a particular decoder from at least one of frame information, header information, content code word information, and derivatives thereof.

22. The apparatus of claim 21, further comprising at least one switch, the at least one switch responsive to the determination of a particular decoder by the logic to connect the formatted bit stream to the input of the particular decoder.

23. The apparatus of claim 21, wherein the format detector comprises a device configured to detect at least one of frame synchronization information and frame structure information of the formatted bit stream.

24. The apparatus of claim 21, wherein the format detector comprises a device configured to detect packet header information in the formatted bit stream.

25. The apparatus of claim 21, wherein the format detector comprises a device configured to detect at least one of a code word, a code word value, a pattern of code words in a portion of a coded content of the bit stream, a pattern of code word values in a portion of a coded content of the bit stream, and a derivative thereof, wherein the at least one code word, code word value, pattern of code words in a portion of a coded content of the bit stream, pattern of code word values in a portion of a coded content of the bit stream, and derivatives thereof, comprises an indicator of the bit stream format.

26. A method for selecting among a plurality of decoders for formatted bit streams, the method comprising steps of:

detecting at least one bit stream format indicator in information read from a formatted bit stream; and determining from the at least one bit stream format indicator a correct decoder for decoding a detected bit stream format, wherein the step of determining a correct decoder includes at least looking up a detected format indicator via a source, the source associating decoders with detected format indicators.

27. The method of claim 26, wherein a step of determining a correct decoder includes a steps of:

deriving a format indicator from information read from a formatted bit stream of the formatted bit streams; and looking up a detected format indicator in a table, the table associating decoders with detected format indicators.

28. The method of claim 26, further comprising a step of switching the formatted bit stream to an input of the correct decoder.

29. The method of claim 26, wherein the step of detecting the at least one bit stream format indicator in information read from the formatted bit stream comprises detecting at least one of frame synchronization information and frame structure information.

30. The method of claim 26, wherein the step of detecting the at least one bit stream format indicator in information read from the formatted bit stream comprises decoding the packet header information in the formatted bit stream.

31. The method of claim 26, wherein the step of detecting at least one bit stream format indicator in information read from a formatted bit stream comprises detecting at least one of a code word, a derivative of a code word, a pattern of code words, a code word value, a derivative of a code ward value, and a pattern of a code word values, in a portion of a coded content of the formatted bit stream.

32. The method of claim 26, wherein the step of detecting at least one bit stream format indicator in information read from a formatted bit stream comprises detecting at least one of frame information, packet header information, and code words.

33. The method of claim 26, wherein the step consisting of detecting at least one bit stream format indicator comprises the sub-steps of detecting in sequence at least two of frame information, header information, and code words.

34. The method of claim 33, wherein a format indicator detecting step occurring later in a sequence comprises a step responsive to an ambiguous result from a format indicator detecting step occurring earlier in the sequence.

35. The method of claim 34, wherein a later format indicator detecting step comprises a step selected responsive to a particular ambiguity in the results of an earlier format detecting step.

36. The method of claim 26, wherein the step consisting of detecting at least one bit stream format indicator comprises detecting a plurality of format indicators in parallel, and wherein the method further comprises at least one of selecting a single format detector output based upon a predetermined criterion and combining the outputs from a plurality of format detectors.

* * * * *